United States Patent [19]
Foran

[11] Patent Number: 5,536,763
[45] Date of Patent: Jul. 16, 1996

[54] STAINING RESIN COMPOUNDS AND PRODUCTS THEREFROM

[75] Inventor: Kenneth C. Foran, Farragut, Tenn.

[73] Assignee: Rubbermaid Office Products Inc., Maryville, Tenn.

[21] Appl. No.: 461,034

[22] Filed: Jun. 5, 1995

[51] Int. Cl.$^6$ ............................ C08L 1/00; C08K 3/26; C08K 3/34; D06N 7/04
[52] U.S. Cl. ............................ 524/13; 524/14; 524/425; 524/451; 524/494; 428/151; 264/73; 264/77
[58] Field of Search ............................ 524/13, 14, 425, 524/451, 494; 428/106, 151; 264/73, 77, 129, 162, 219; 427/262

[56] References Cited

U.S. PATENT DOCUMENTS

| | | | |
|---|---|---|---|
| 2,848,749 | 8/1958 | Tobias | 18/48.8 |
| 3,309,444 | 3/1967 | Schueler | 264/109 |
| 3,431,157 | 3/1969 | Mack | 156/82 |
| 3,816,155 | 6/1974 | Iverson et al. | 117/10 |
| 3,915,910 | 10/1975 | Nakano et al. | 260/17.4 |
| 3,935,329 | 1/1976 | Reilly et al. | 427/35 |
| 3,936,518 | 2/1976 | Soda et al. | 264/45.5 |
| 4,103,056 | 7/1978 | Barratto et al. | 428/142 |
| 4,480,061 | 10/1984 | Coughlini et al. | 524/15 |
| 4,610,900 | 9/1986 | Nishibori | 428/15 |
| 4,686,257 | 8/1987 | Mitsuno et al. | 524/449 |
| 5,075,059 | 12/1991 | Green | 264/129 |
| 5,089,313 | 2/1992 | Cope | 428/151 |
| 5,198,481 | 3/1993 | Cope | 524/9 |
| 5,252,640 | 10/1993 | Cope | 524/15 |
| 5,269,991 | 12/1993 | Gueret | 264/73 |
| 5,330,804 | 7/1994 | Allison et al. | 428/15 |
| 5,334,632 | 8/1994 | Cope | 524/9 |
| 5,334,633 | 8/1994 | Cope | 524/15 |
| 5,336,710 | 8/1994 | Rao et al. | 524/494 |

FOREIGN PATENT DOCUMENTS 3264345  11/1988  Japan .................... 428/151

*Primary Examiner*—Paul R. Michl
*Assistant Examiner*—LaVonda R. DeWitt
*Attorney, Agent, or Firm*—Renner, Kenner, Greive, Bobak, Taylor & Weber

[57] ABSTRACT

A method of preparing a stainable resin material includes compounding 100 parts by weight of a resin material with from about 10 to about 30 parts by weight of a filler material being a plurality of individual filler particulate; and, heat polishing the surface of the material at a temperature sufficient to remove a portion of the material surface such that at least a portion of the filler particulate proximate to the surface is at least partially exposed. The filler material is selected from the group consisting of stainable materials. Products made using such a material may include striations to simulate the appearance of wood.

16 Claims, 2 Drawing Sheets

STAINING RESIN COMPOUNDS AND PRODUCTS THEREFROM

TECHNICAL FIELD

The present invention is directed toward the staining of plastic resins. More particularly, the invention is directed toward the staining of resins such as, for example, polypropylene and polyethylene. More specifically, the invention relates to the staining of such a resin which has been compounded with a filler material. The surface of the material is heat treated in order to remove a portion of the surface of the material thereby exposing at least a portion of the underlying filler material. The filler material readily accepts a stain such as a wood stain or the like.

BACKGROUND OF THE INVENTION

There have been a number of attempts to prepare a synthetic product with the appearance of wood. The benefits of such a successful synthetic product would include, for example, the ability to mold the product using conventional molding techniques into the shape of the desired article. Otherwise, a wooden article has to be individually cut and shaped which is a time consuming and labor intensive practice. Molding operations can be substantially automated and the resulting materials are often lighter and of acceptable strength as compared to the wood product.

However, it has proven difficult to prepare stains, dyes, paints or the like which can be easily coated onto synthetic resin materials. Much effort has been made with respect to the compatibility between the synthetic resin material itself and the stain used thereon. Other attempts at preparing stainable or paintable synthetic resin products, have included loading the resin material with a high amount of filler material. For example, U.S. Pat. No. 4,480,061 discloses a synthetic resin material with a high amount of loading. Because of the high loading amount, the filler material is exposed at the surface of the product, therefore apparently, readily accepting of a stain. A drawback with this type of product is that the high amount of loading increases the weight, brittleness and expense of the product and also decreases its ability to be easily molded by conventional techniques.

An example of preparing a synthetic resin with a compatibilizing layer is disclosed, for example, in U.S. Pat. No. 5,252,640. A liquid coating is applied to a wood product wherein the wood grain pattern is applied in ink to the product. The ink composition is acceptable by the liquid coating layer.

Another compatibilized product is disclosed in U.S. Pat. No. 3,935,329 wherein a rubber product such as an styrene/butadiene rubber is provided With components that will cause the rubber to be compatible with a paint material. The rubber material includes a cross-linkable rubber material, a polymeric stiffening agent, a plasticizing agent, and optionally, an accelerating agent, a curing agent, an activating agent or a filler material.

A need exists for a synthetic resin which can readily accept a standard stain, such as a commonly and commercially available wood stain or the like. The resin would desirably not have a large amount of filler material therein, such that the resulting material retains the benefits of the resin itself without an increase in brittleness and a decrease in the ability to mold or prepare products from the resin material according to conventional techniques. It is also desirable that the resin material will accept a stain without a need to provide compatibilizers between the resin and the staining agent itself. That is, the resin material once prepared should readily accept a common wood stain.

DISCLOSURE OF THE INVENTION

It is therefore, an object of the present invention to provide a synthetic resin material.

It is another object of the present invention to provide such a material which will accept a wood stain or the like.

It is yet another object of the present invention to provide a synthetic resin material which has the appearance of wood.

It is still another object to provide a synthetic resin material which has the appearance of wood and which can be stained using conventional wood stains.

It is yet another object to provide a method of preparing a stainable synthetic resin material.

These an other objects of the present invention, as well as the advantages over the known art, which shall become apparent from the description which follows, are accomplished by the invention as hereinafter described and claimed.

In general, a method of preparing a stainable resin material comprises compounding 100 parts by weight of a resin material with from about 10 to about 30 parts by weight of a filler material. The filler material comprises a plurality of filler particulate. The method also includes heat polishing the surface of the material at a temperature sufficient to remove a portion of the material surface such that at least a portion of the filler particulate proximate to the surface is at least partially exposed. The filler material is stainable.

There is also provided according to the present invention a method of preparing a synthetic material having the appearance of wood. The inventive method comprises forming a base material by compounding 100 parts by weight of a resin material with from about 10 to about 30 parts by weight of a filler material comprising a plurality of filler particulate. The method also includes forming striations in the surface of the base material to simulate wood grain. The surface of the base material is heat polished at a temperature sufficient to remove a portion of the materials surface such that at least a portion of the filler particulate proximate to the surface is at least partially exposed. The filler material is stainable.

A synthetic article according to the invention and simulating the appearance of wood, is prepared by forming a base material by compounding 100 parts by weight of a resin material with from about 10 to about 30 parts by weight of a filler material comprising a plurality of filler particulate. The article is also prepared by forming striation in the surface of the base material to simulate wood grain and heat polishing the surface of the base material at a temperature sufficient to remove a portion of the material surface such that at least a portion of the filler particulate proximate to the surface is at least partially exposed. The filler material is stainable.

A preferred exemplary synthetic resin material according to the invention and incorporating the concepts thereof is shown by way of example in the accompanying drawings without attempting to show all the various forms and modification in which the invention might by embodied, the invention being measured by the appended claims and not by the details of the specification.

PREFERRED EMBODIMENT FOR CARRYING OUT THE INVENTION

Figure 1:
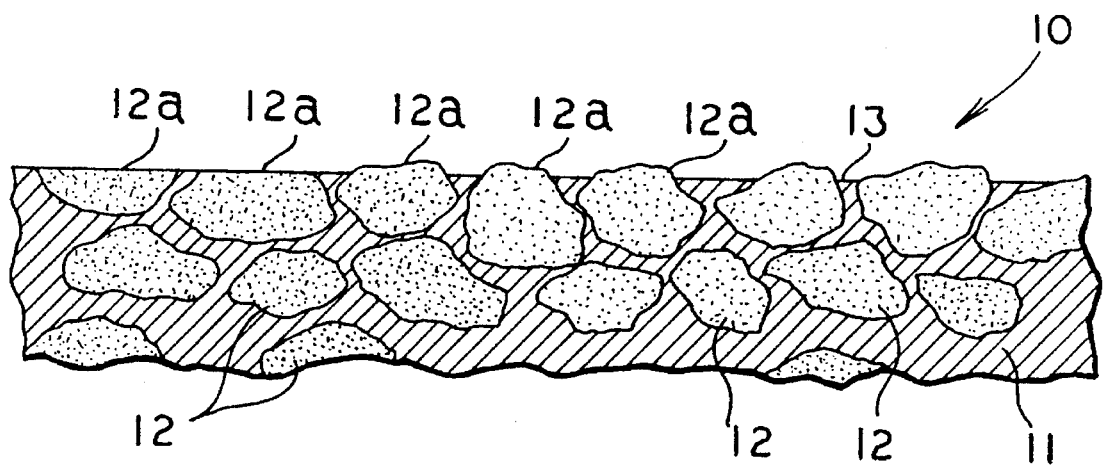
FIG. 1 is an enlarged sectional elevational view of a product according to the present invention and showing the surface of a synthetic resin material having particulate filler proximate to the surface at least partially exposed.

The present invention provides a filled synthetic product which will readily accept a conventional stain. By "stain" it is understood to mean any conventional staining agent, dye, ink, paint or the like without limitation, with conventional wood stains being preferred.

The synthetic product of the invention includes a synthetic resin matrix filled with a particulate filler material to form a resin compound or base material. The synthetic resin includes for example, polypropylene homo- and co-polymers, low and high density polyethylenes, mixtures thereof and the like. High density polyethylene is a preferred matrix resin.

There is dispersed within the matrix resin, a particulate filler. By particulate it is understood to mean without limitation, particles, flakes, fibers, felts, minerals, mixtures or combinations thereof and the like. The filler material must be one that will accept the staining agent of choice. Therefore, it will be appreciated that the actual filler material chosen will vary depending upon the stain employed, which itself will vary depending upon the end use of the invention.

Mineral filler materials are one preferred class of filler materials. Useful mineral fillers include for example, talc, calcium carbonate, wood pulp, glass fibers, mixtures or combinations thereof and the like.

It is appreciated that the amount of filler present in the compounded resin matrix will vary depending upon the end use of the material. For example, in a product simulating a light colored wood, a lesser amount of filler might be employed as compared to a material intended to simulate a darker wood color. The larger amount of filler material will provide a larger surface area for accepting the stain, and hence, a darker color can be achieved. Similarly, the size and shape of the particulate material will depend upon the end use of the inventive material.

It is preferred however, that when the matrix resin is a polypropylene or a polyethylene, then a useful amount of filler is from about 10 to about 30 parts by weight based upon 100 parts of the matrix resin, with from about 15 to about 20 parts by weight being more preferred.

With such a relatively low amount of filler in the invention product, it cannot be guaranteed that a sufficient amount of filler material will be exposed at the surface of the material to accept a stain such as with prior art materials having high filler loading. It is therefore, a step according to the present invention to expose the filler particulate proximate to the surface of the matrix resin.

This step of exposing the filler materials at a location proximate to the surface of the matrix resin, is accomplished by removing a portion of the surface itself. By only removing a portion of the resin material surface, there remains contiguous portions of resin material contacting and at least partially surrounding a given filler particulate. This contacting relationship provides a mechanical lock or bond between the synthetic resin and the filler particulate. That is, even if partially exposed, the filler particulate is retained at least partially within the resin matrix. The exposed and mechanically locked filler material will readily accept a stain. Hence, the resin compound can be stained by use of conventional stains.

The heat treatment or polishing of the surface of the compounded resin can be accomplished by numerous conventional techniques. For example, the surface of the compound may be exposed to an open flame, ultraviolet light radiation or the like. Preferably, the source of heat is sufficient to melt away the surface of the compound, substantially without degrading or otherwise damaging the filler particulate of the remaining underlying resin material. As the surface of the resin compound is thereby melted away, the underlying and proximate filler particulate is effectively exposed.

The amount of the surface of the compounded resin which is removed will again, vary depending upon the end use of the material, the size of the particulate, the nature of the resin polymer and the like. For example, if a relatively low amount of heat treating is provided, relatively small portions of filler materials will likely be exposed, as compared to a larger amount of heat treating (i.e., exposure to heat for longer periods and/or at higher temperatures). The more of the filler particulate that is exposed, the more stain the resin compound will accept.

As an example, when the matrix resin is a polypropylene or a polyethylene, an open flame applied directly to the surface by hand is useful for removing the desired amount of surface resin material. Other techniques of heat polishing include for example, heat tunnels, heat lamps, infrared lights, polarizing the surface of the article by surface ionization, combinations thereof and the like.

There is shown in FIG. 1, a resin compound generally designated by the number 10 as described hereinabove. The compound 10 includes a resin matrix 11. Mixed within the matrix resin, thus producing the compounded resin material, is an amount of a filler particulate, 12. For purposes of illustration only, the filler particulate is shown as irregularly shaped particles, it being understood that the particulate can have other shapes as was also addressed hereinabove. Further the amount of filler material 12 shown in the drawings as compared to matrix material 11 is not intended to depict the useful or even preferred amount of filler loading, but rather is provided for explanatory purposes only.

The surface 13 of the resin compound 10 has been partially removed, such as by a means as described above, such that discrete portions 12a of the filler particulate 12 is exposed at or above the surface 13. Again, these exposed particulate materials will accept a staining agent. Hence, the heat treated, compounded resin is said to be "stainable". By "exposed" it is meant not covered or coated with matrix resin. Exposed portions 12a may extend above surface 11 or be flush or receded with respect thereto, as variously depicted in the drawings.

Figure 2:
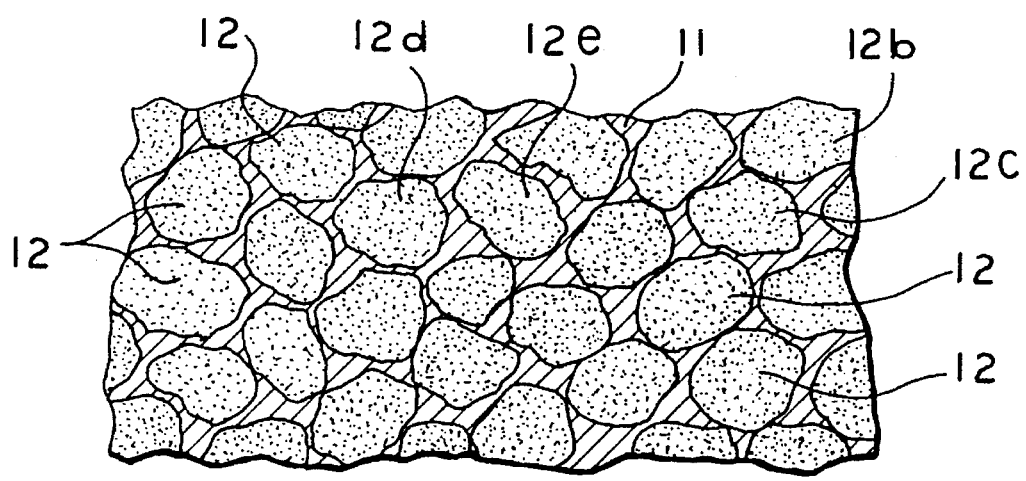
FIG. 2 is a top plan view of the material shown in FIG. 1.

As stated hereinabove, the amount of filler employed will vary based upon a number of criteria. An increased amount of filler may result in a number of particles such as particles 12b and 12c in FIG. 2, being in actual physical contact at the surface of the resin compound. If desired, a lower amount of filler may be employed, such that for example, particles 12d and 12e are not in contact with other particles. In this manner, a more or less dense amount of filler can be employed. Generally, the more dense the amount of filler proximate to the surface of the material the more stain that can be applied. The amount of filler and hence the amount of staining, can thereby be effectively controlled.

Figure 3:
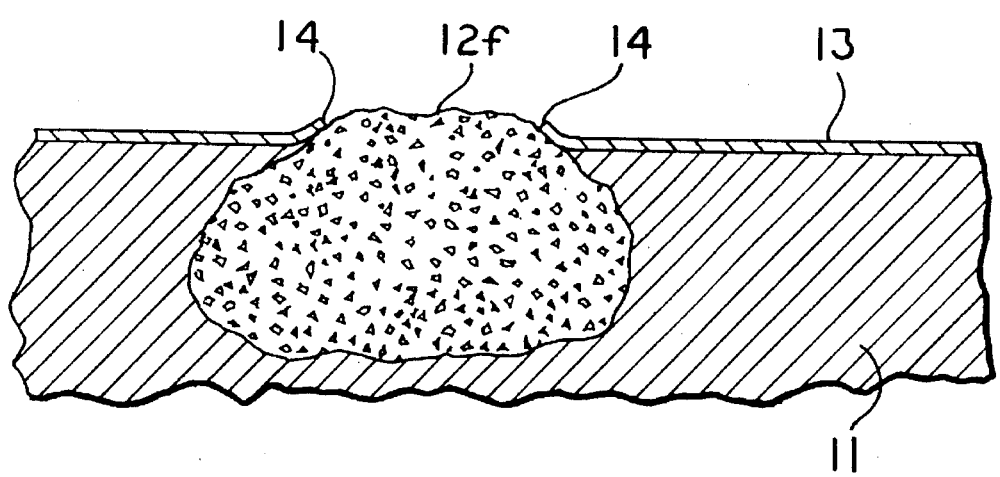
FIG. 3 is an additionally enlarged sectional view of one portion of the material in FIG. 1 showing the mechanical interaction between a singular filler particulate and the synthetic resin.

FIG. 3 shows a more closeup view of one filler particle 12f partially exposed at the surface 13 of resin compound 10 and proximate thereto. The surface 13 has been heat treated such that a portion of surface 13 has been melted away, leaving an open cell 14 which at least partially encapsulates filler particulate 12f. This demonstrates that mechanical lock or bond between the synthetic resin and the particulate material of the invention.

Figure 4:
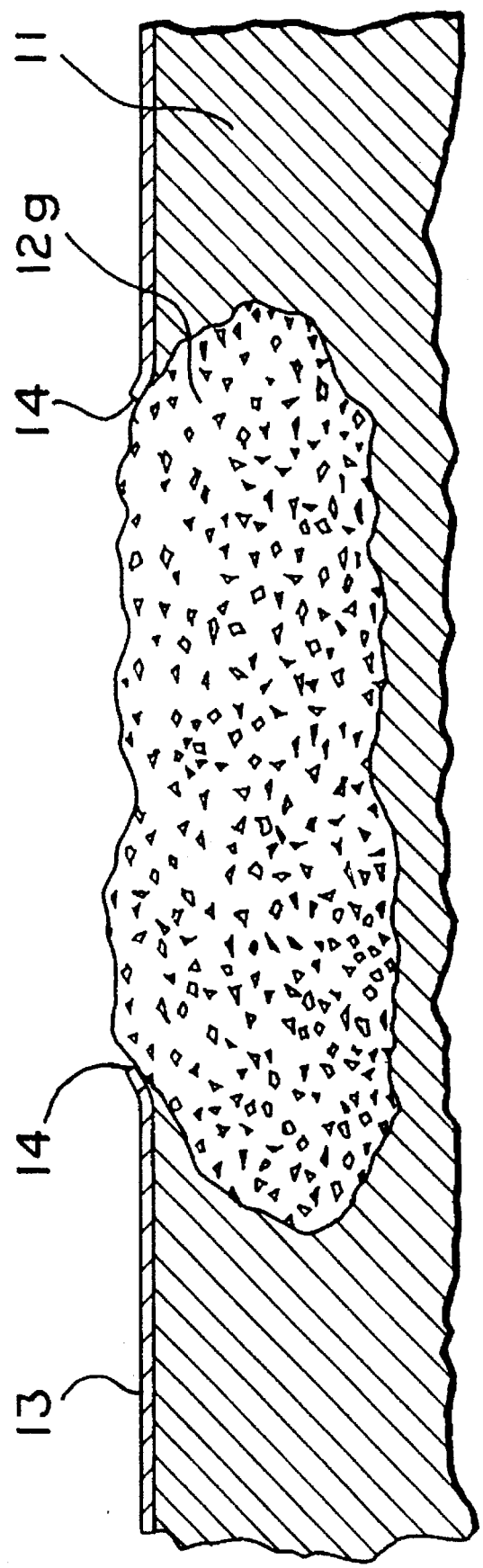
FIG. 4 is an enlarged sectional view as in FIG. 3, showing an alternative shape for the filler particulate.

Particulate filler 12 may be of any shape, such as depicted in the drawings. One preferred shape is depicted in FIG. 4 as being generally elongate particle 12g.

It will be appreciated that other components can be added to the resin compound according to the invention. For example, if desired, conventional antioxidants, antibacterials, processing aids and the like can be compounded with or sequentially with the filler material as discussed hereinabove.

Although not necessarily a limitation of the invention, the present invention has particular application to the formation of synthetic products having the appearance of wood. As such, it is preferred to prepare a material as discussed above, having a number of striations therein to simulate wood grain. The combination of wood grain striations and staining provides the synthetic resin with a wood like appearance.

The wood grain striations may be provided by any conventional technique. For example, the striations may be embossed as disclosed in U.S. Pat. No. 4,610,090, molded as in U.S. Pat. No. 5,075,059, which patents are hereby incorporated by reference for such disclosure, or the like. One preferred method of striating surface 11 of the resin compound is to photo-etch the surface of the production molds by conventional techniques.

GENERAL EXPERIMENTAL

In order to demonstrate the effectiveness of the present invention, a synthetic resin compound was prepared. The compound included 100 parts by weight of high density polyethylene, 20 parts by weight of talc mineral filler. The two components were mixed using conventional mixing techniques.

The resin compound as prepared above was then shaped into a panel having the dimensions of 12 by 17 inches and a wood grain pattern was molded into the surface of the panel by first photo-etching the surface of the mold tool.

The striated panel was then subjected to an open flame to heat polish the panel.

The heat polished panel was then contacted with a conventional wood stain, namely, Poly-Shades brand stain available from Minwax by brushing the stain onto the panel and then wiping with a cloth. The resulting stained panel substantially appeared to be real wood.

In another experiment, a similar panel as above was prepared, except polypropylene was employed as the base resin. The resulting panel, after flaming and staining, had the substantial appearance of real wood.

The invention is thus an improvement over the known art which required high loading of the resin with filler and/or the use of compatabilizing agents between a synthetic resin and a staining agent. The present invention is therefore, a novel and unique improvement over the known art. It is thus evident that a synthetic resin compound and articles therefrom prepared in accordance with the concepts of the present invention accomplish the objects of the invention and substantially improves the art.

Thus, it should be evident that the products and methods of the present invention are highly effective in providing a stainable synthetic resin. The invention is particularly suited for preparing synthetic articles having the appearance of wood, but is necessarily limited thereto.

Based upon the foregoing disclosure, it should now be apparent that the use of the methods and products described herein will carry out the objects set forth hereinabove. It is, therefore, to be understood that any variations evident fall within the scope of the claimed invention and thus, the selection of specific component elements can be determined without departing from the spirit of the invention herein disclosed and described. Thus, the scope of the invention shall include all modifications and variations that may fall within the scope of the attached claims.

What is claimed is:

1. A method of preparing a stained resin material comprising:

compounding 100 parts by weight of a resin material with from about 10 to about 30 parts by weight of a stainable filler material comprising a plurality of filler particulate; and, heat polishing the surface of the material at a temperature sufficient to remove a portion of the material surface such that at least a portion of said filler particulate proximate to said surface is at least partially exposed;

wherein said filler material is selected from the group consisting of particles, flakes, fibers, felt and mixtures thereof, and contacting said surface with a staining material.

2. A method as in claim 1, wherein said resin material is selected from the group consisting of polypropylene homo- and co-polymers, high and low density polyethylenes, and mixtures thereof.

3. A method as in claim 2, wherein said polyethylene is high density polyethylene.

4. A method as in claim 1, wherein said filler material is selected from the group consisting of talc, calcium carbonate, wood pulp, glass fibers, and mixtures thereof.

5. A method as in claim 1, wherein said heat polishing includes open flame polishing.

6. A method as in claim 1, wherein said heat polishing includes polishing with ultraviolet light radiation.

7. A stainable article prepared according to the method of claim 1.

8. A stained article as in claim 1, wherein said staining material is selected from the group consisting of wood stains, ink, dyes, paints, and mixtures thereof.

9. A method of preparing a synthetic material having the appearance of wood comprising:

forming a base material by compounding 100 parts by weight of a resin material with from about 10 to about 30 parts by weight of a stainable filler material comprising a plurality of filler particulate;

forming striations in the surface of said base material to simulate wood grain; and, heat polishing the surface of said base material at a temperature sufficient to remove a portion of the material surface such that at least a portion of said filler particulate proximate to said surface is at least partially exposed;

wherein said filler material is selected from the group consisting of particles, flakes, fibers, felt and mixtures thereof, and contacting said surface with a staining material.

10. A method as in claim 9, wherein said resin material is selected from the group consisting of polypropylene homo- and co-polymers, high and low density polyethylenes, and mixtures thereof.

11. A method as in claim 9, wherein said filler material is selected from the group consisting of talc, calcium carbonate, wood pulp, glass fibers, and mixtures thereof.

12. A method as in claim 9, wherein said heat polishing includes open flame polishing.

13. A method as in claim 9, wherein said heat polishing includes polishing with ultraviolet light radiation.

14. A method as in claim 9, wherein said heat polishing includes polarizing the surface of the part by surface ionization.

15. A stained article having the appearance of wood, formed from the synthetic material prepared according to claim 9 further comprising contacting said surface of said base material with a stain selected from the group consisting of wood stains, dyes, inks, paints, and mixtures thereof.

16. An synthetic article simulating the appearance of wood, prepared by forming a base material by compounding 100 parts by weight of a resin material with from about 10 to about 30 parts by weight of a stainable filler material comprising a plurality of filler particulate;

forming striations in the surface of said base material to simulate wood grain; and, heat polishing the surface of said base material at a temperature sufficient to remove a portion of the material surface such that at least a portion of said filler particulate proximate to said surface is at least partially exposed;

wherein said filler material is selected from the group consisting of particles, flakes, fibers, felt and mixtures thereof, and contacting said surface with a staining material.

* * * * *